(12) United States Patent
Haas et al.

(10) Patent No.: US 10,468,970 B2
(45) Date of Patent: Nov. 5, 2019

(54) STARTING CURRENT LIMITATION

(71) Applicant: ebm-papst Mulfingen GmbH & Co. KG, Mulfingen (DE)

(72) Inventors: Günter Haas, Mulfingen (DE); Alex Schneider, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 15/548,057

(22) PCT Filed: Jan. 11, 2016

(86) PCT No.: PCT/EP2016/050384
§ 371 (c)(1),
(2) Date: Aug. 1, 2017

(87) PCT Pub. No.: WO2016/124358
PCT Pub. Date: Aug. 11, 2016

(65) Prior Publication Data
US 2018/0026522 A1  Jan. 25, 2018

(30) Foreign Application Priority Data

Feb. 2, 2015 (DE) .................. 10 2015 101 457
Mar. 13, 2015 (DE) .................. 10 2015 103 713

(51) Int. Cl.
*H02M 1/32* (2007.01)
*H02M 1/36* (2007.01)
*H02H 9/02* (2006.01)

(52) U.S. Cl.
CPC .............. *H02M 1/32* (2013.01); *H02H 9/02* (2013.01); *H02M 1/36* (2013.01); *H02M 2001/322* (2013.01)

(58) Field of Classification Search
CPC .......... H02M 1/32; H02M 1/36; H02M 3/156; H02M 7/2176; H02M 1/4225; H02M 2001/322; H02H 9/02
See application file for complete search history.

(56) References Cited

U.S. PATENT DOCUMENTS

2003/0035311 A1   2/2003  Phadke
2005/0057873 A1*  3/2005  Kitagawa .............. H02H 9/046
                                                    361/91.1
(Continued)

FOREIGN PATENT DOCUMENTS

CN   102355124 B    1/2014
DE   102012219488 A1  4/2014
(Continued)

OTHER PUBLICATIONS

Neale, R.: "Tiny Switch Offers the Mains Plug Integrated Power Supply", Electronic Engineering, Morgan-Grampian Ltd. London. GB vol. 70, No. 861, Oct. 1, 1998 (Oct. 1, 1998), p. 51/52.
(Continued)

*Primary Examiner* — Nguyen Tran
*Assistant Examiner* — Demetries A Gibson
(74) *Attorney, Agent, or Firm* — Harness, Dickey & Pierce, P.L.C.

(57) ABSTRACT

The invention relates to a method and to a circuit arrangement for limiting the starting current for intermediate voltage circuits that have at least one storage capacitor.

14 Claims, 6 Drawing Sheets

(56) References Cited

U.S. PATENT DOCUMENTS

| | | | | |
|---|---|---|---|---|
| 2006/0164777 | A1* | 7/2006 | Ferianz | H04M 1/745 |
| | | | | 361/93.1 |
| 2006/0244392 | A1* | 11/2006 | Taipale | H05B 41/282 |
| | | | | 315/200 R |
| 2008/0253155 | A1* | 10/2008 | Peng | H02M 1/32 |
| | | | | 363/50 |
| 2010/0109554 | A1* | 5/2010 | Lecheler | H05B 41/2856 |
| | | | | 315/291 |
| 2012/0313541 | A1* | 12/2012 | Egawa | H05B 33/083 |
| | | | | 315/201 |
| 2014/0055174 | A1* | 2/2014 | Knoedgen | H02M 1/36 |
| | | | | 327/109 |
| 2015/0022087 | A1* | 1/2015 | Brnada | H02M 1/12 |
| | | | | 315/112 |
| 2016/0126859 | A1* | 5/2016 | Wang | G06F 1/263 |
| | | | | 713/300 |
| 2016/0141965 | A1* | 5/2016 | Hasegawa | H02M 7/538 |
| | | | | 363/21.04 |

FOREIGN PATENT DOCUMENTS

| | | |
|---|---|---|
| EP | 0591915 A2 | 4/1994 |
| EP | 2587656 A1 | 5/2013 |
| EP | 2639949 A1 | 9/2013 |

OTHER PUBLICATIONS

International Search Report (in German with English Translation) for PCT/EP2016/050384, dated Apr. 4, 2016; ISA/EP.
Adel Sedra et al., Microelectronics Circuits 6th Edition, Oxford University Press, Dec. 15, 2009 (Dec. 15, 2009), pp. 910-973.

* cited by examiner

50
Switching
Regulator

STARTING CURRENT LIMITATION

CROSS REFERENCE TO RELATED APPLICATIONS

This application is a U.S. National Phase Application under 35 U.S.C. 371 of International Application No. PCT/EP2016/050384 filed on Jan. 11, 2016 and published in German as WO 2016/124358 A1 on Aug. 11, 2016. This application claims priority to German Application No. 10 2015 101 457.2 filed on Feb. 2, 2015 and German Application No. 10 2015 103 713.0 filed on Mar. 13, 2015. The entire disclosures of all of the above applications are incorporated herein by reference.

FIELD OF THE INVENTION

The invention relates to a method and a circuit arrangement for limiting the starting current for an intermediate circuit or an intermediate voltage converter.

BRIEF SUMMARY

An intermediate circuit is generally known as an electrical circuit device which couples several electrical networks via converters as an energy storage. For example, the direct voltage intermediate circuit which is operated with an intermediate circuit capacitor at a constant voltage and variable current is known.

The intermediate circuit of such voltage intermediate circuit converters generally has a comparatively large capacity which serves as a low-ohmic source for connected converters. A capacitive behavior, i.e., a current which is high immediately after the starting and which fades thereafter is, however, disadvantageous. The high charging current which flows upon the plugging or engaging of the concerned converter into the storage capacitor can, to the extent that no limiting measures are carried out, lead to the destruction of structural elements. Therefore, upon the placing or cutting in of network voltage on EC devices, which typically have a high capacity built into their intermediate circuit, a correspondingly high starting current impulse will flow. This current impulse must also therefore be limited independently of the protection of the structural element in order to keep the expense for the entire installation including the safety measures in the network low.

A solution is known from EP 0591 915 A2 in which a choke is arranged in series with a switch. In the case of the occurrence of an overvoltage the rising current leads by the function of the choke to an induced voltage on the choke, this voltage is recognized and the MOSFET then blocks it.

The starting current limitation by a temperature-dependent resistor (NTC), also known as a hot conductor, is widely used. Such a hot conductor is usually used especially in network parts as a starting current limiter which is connected in series to the consumer but does not absolutely have to be bridged. On account of its high resistance in the cold state it limits the current after the turning on. Thereafter, it is heated by the current flow, reduces its resistance and then only causes slight losses in order to maintain its own temperature. Since in the case of an NTC the resistance value is reduced with increasing temperature, this means, however, in the reversing terminal that in the case of a hot (warm from operating) NTC the resistance value of the limiting resistance drops very low and the starting current impulse increases very greatly. This can again result in precisely the initially described problems and causes of failure, which is disadvantageous when using NTC solutions for current limitation.

A basically different possibility is the using of a fixed resistor connected in series to the intermediate circuit capacitor, wherein this resistor must be bridged after the charging process of the intermediate circuit capacitor to be charged. To this end an additional switching element is necessary which must also be regulated.

The present invention has the problem of overcoming the previously cited disadvantages and of providing a circuit arrangement for the starting current limitation in an intermediate circuit which can be realized with as little expense as possible, can be reliably operated and operates with as few losses as possible.

The basic concept of present invention is, among other things, to provide a specific charging circuit in order to sequentially perform the charging of the storage capacitor and of charging the storage capacitor, preferably step-by-step, by successive charging amounts, wherein the charging circuit carries out the through connecting and blocking of the charging current circuit to the storage capacitor via semiconductor structural elements. A charging of the storage capacitor takes place here under an envelope of an exponential function which asymptotically approaches the charging capacity of the capacitor.

Accordingly, the invention suggests a circuit arrangement for limiting the starting current for intermediate voltage circuits which are constructed with at least one storage capacitor, wherein in order to limit the charging current flowing into the storage capacitor a charging circuit is provided between a feed voltage source and the storage capacitor which comprises at least one semiconductor structural element with a gate, a resistor and a transistor, wherein a or the drain source stretch (between the drain connection and the source connection) of the semiconductor structural element is arranged in series with the storage capacitor, and wherein the charging of the storage capacitor takes place via a plurality of charging current impulses successively in time which flow to the storage capacitor during the brief through connecting of the drain source stretch of the semiconductor structural element. The charging current is thereafter divided into a plurality of charging current components which charge the storage capacitor sequentially in time.

In a preferred embodiment of the invention the gate of the semiconductor structural element is connected or (depending on the switching state) can be connected to the mass potential via the drain source stretch of the transistor connected to this gate and, according to whether the drain source stretch of the semiconductor structural element is consequently blocked or connected through, the gate of the semiconductor structural element is either connected to the mass potential or to a control voltage UST.

Furthermore, it is advantageously provided that the drain source stretch of the semiconductor structural element is arranged in series with the resistor. This branch accordingly constitutes the charging current branch for the charging current of the storage capacitor. A charging current which is limited in time can only flow for the short time span in which the semiconductor structural element is connected through. As soon the gate of the semiconductor structural element is connected again to the mass potential, the drain source stretch goes into the blocking state and the charging current breaks off.

As previously explained, a resistor is arranged in the charging branch in series with the drain source stretch of the semiconductor structural element so that a voltage drop is brought about on the resistor which is used to control the transistor base in order to connect the transistor through, which again brings it about that the gate of the conductor structural element becomes connected to the mass potential and the semiconductor structural element goes into its blocking state. As soon as the blocking state begins, no more current flows in the charging branch through the resistor and the voltage on the resistor immediately drops. Therefore, no more control voltage is on the transistor base and the transistor goes into the blocking state. However, as soon as the transistor is again in the blocking state, the control voltage is again on the gate of the semiconductor structural element and the semiconductor structural element is again connected through, etc.

This process is repeated until the storage capacitor is charged. Since the charging current of the charging impulses becomes increasingly less, at some time the voltage drop on the resistor drops below a threshold value necessary for the switching of the base on the capacitor.

Therefore, the invention provides that the transistor comprises a base and that the resistor is connected to the source connection of the semiconductor structural element and that an intermediate tap is present between the resistor and the source connection which tap is connected to the transistor gate.

Furthermore, it is advantageously provided that the gate of the semiconductor structural element is connected for applying the control voltage UST required for switching the gate to a control voltage line, preferably with a tap on a voltage divider.

In another advantageous embodiment of the switching arrangement according to the invention it is provided that the storage capacitor is connected to the drain connection of the semiconductor structural element.

A MOSFET (e.g., a SuperMesh Power MOSFET) or a transistor is preferably used as semiconductor structural element. Furthermore, it is preferred if the transistor for switching the gate of the MOSFET or of the semiconductor element is an NPN transistor.

Furthermore, another transistor which can be switched on for further protection for the static operation is provided which bridges the charging circuit for charging the charging capacitor during the switching on. Moreover, in another advantageous embodiment of the circuit another transistor which can be switched on can be connected to the gate of the semiconductor structural element (e.g. the gate of the MOSFET) in order to switch the semiconductor structural element into its blocking state. This ensures that during the operation of a consumer on the intermediate circuit no currents can flow via the branch for charging the storage capacitor, which serves to further protect the storage capacitor and accordingly the entire intermediate circular circuitry.

Another aspect of the present invention concerns a method for limiting the starting current for intermediate voltage circuits with the switching arrangement as described above, wherein:

a. The charging of the storage capacitor is brought about in each case by a charging current impulse ($I_1, \ldots I_n$) for the duration of the connecting through of the drain source stretch of the semiconductor structural element by putting a control voltage on the gate of the semiconductor structural element for a brief time and during which a charging amount corresponding to the particular charging current impulse ($I_1, \ldots I_n$) flows to the storage capacitor (2), and b. During the flowing of this charging current via the resistor a voltage drops on the latter which is applied via an (intermediate) tap on the transistor gate and then connects the transistor through, as a result of which the potential on the gate of the semiconductor structural element is blocked, as a result of which the charging current is again interrupted as authorized.

According to the method of the invention the steps a) and b) are repeated until the storage capacitor is charged and no more charging current flows (cyclic charging).

Alternatively, when using a specific switching regulator such as a blocking transformer (Tiny Switch), a (cyclic) charging of the storage capacitor can also take place via a charging current impulse ($I_1, \ldots I_n$) for the duration of the connecting through of the drain source stretch of the switching regulator via the closed power switch, wherein the charging is brought about for this time period while a charging amount corresponding to the particular charging current impulse ($I_1, \ldots I_n$) flows to the storage capacitor and the charging current of the charging capacitor rises and during the rising of the charging current the power switch is reopened via a current threshold of the switching regulator, as a result of which the charging current is interrupted.

The circuit is preferably operated in such a manner that the charging current to the storage capacitor is interrupted while the drain source stretch of the semiconductor structural element is blocked, as a result of which the voltage on the resistor and therefore on the transistor gate drops and the transistor changes into the blocked state. However, in the blocked state of the transistor the gate of the semiconductor structural element is no longer on mass potential but rather on the control potential so that the drain source stretch is connected through again and a charging current briefly flows again via the charging branch to the storage capacitor, etc.

Alternatively, the above-described charging with charging current impulses can also take place by a charging circuit in which, e.g., a blocking transformer is used. The working principle of the blocking transformer is utilized here in order to transform the previously described inventive idea and each time a small amount of energy in the magnetic field of a transformer is stored in a charging phase and in the second (of the blocked) phase the "discharging" takes place via the secondary side. This charging/discharging cycle will run through with a certain switching frequency, e.g., 130 kHz.

The invention provides that the method is preferably further developed in such a manner that prior to the switching on of a consumer fed from the intermediate voltage circuit another transistor is activated in order to bridge the charging circuit for charging the charging capacitor. I.e., no charging current can flow via the storage capacitor during operation and also no other losses occur on the resistor.

In other words, before the consumer to be operated and which is fed from the intermediate circuit is switched on, an additional transistor is switched on. As a result, the charging circuit of the storage capacitor is bridged. For safety, in addition to the cutting of the transistor another transistor is also activated which draws the gate of the semiconductor structural element to mass potential. As a result, the semiconductor structural element can no longer become conductive in static operation and is therefore protected from an overcharging due to a high current.

The voltage levels (potentials) on the gate of the semiconductor structural element, on the gate of the transistor for bridging the charging circuit and the voltage over the resistor are monitored by a monitoring circuit. If a voltage drop occurs on the resistor, which is inadmissible in this case, after the activation of the power path, an error signal is generated which interrupts the circuit and therefore prevents the destruction of the charging branch.

Advantageous embodiments are cited in the following. It is advantageous if the previously cited circuit arrangement is characterized in that the semiconductor structural element is a MOSFET or a transistor, in particular an NPN transistor and/or that furthermore a transistor which can be switched on is provided which bridges the charging circuit for charging the charging capacitor during the switching on. Furthermore, it is advantageous if a transistor which can be switched on is connected to the gate of the semiconductor structural element in order to switch the semiconductor structural element into its blocking state.

Other advantageous further developments of the invention are characterized in the subclaims and are presented in detail in the following together with the description of the preferred embodiment of the invention using the figures.

DETAILED DESCRIPTION

Figure 1:
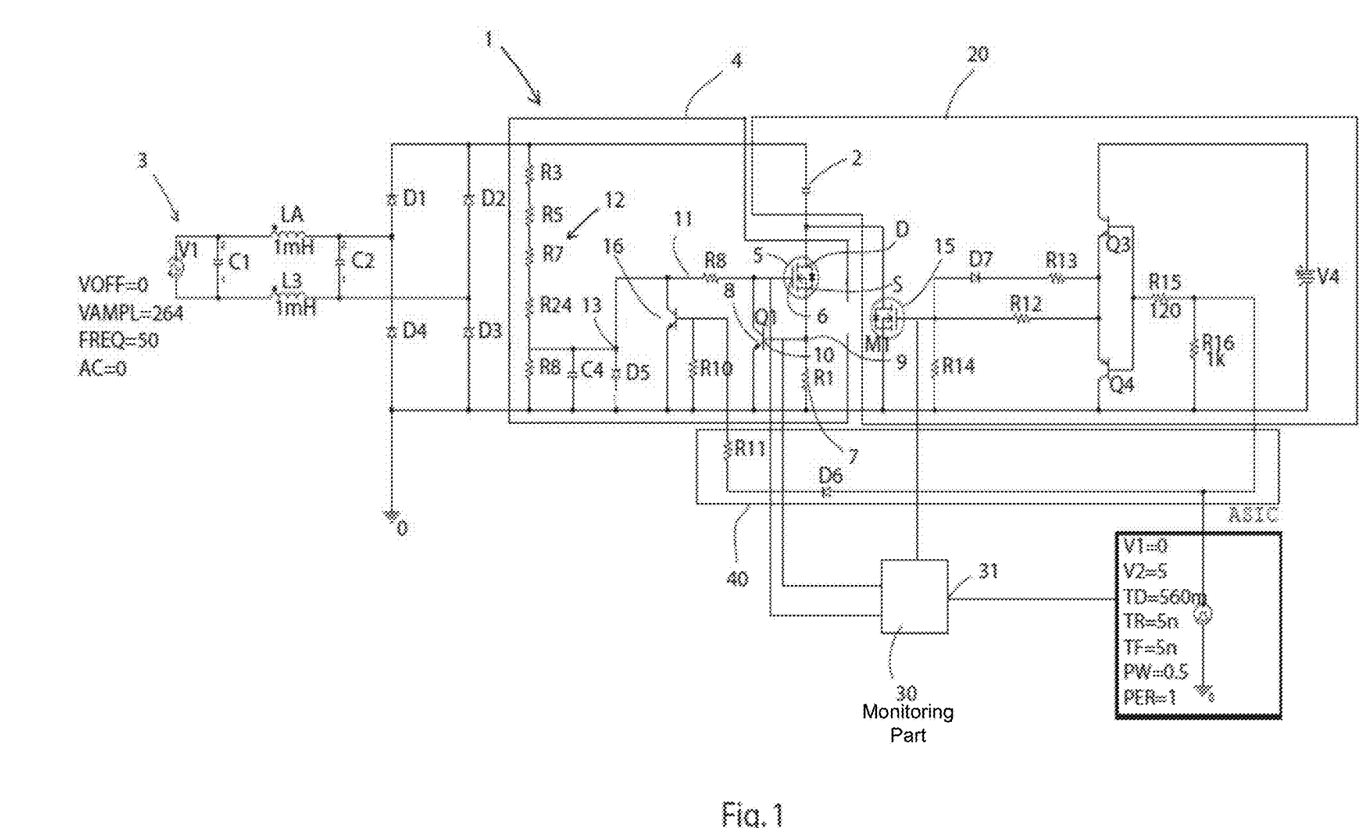
FIG. 1: Shows a basic circuit diagram of a circuit arrangement according to the invention.

FIG. 1 shows a basic circuit diagram of an exemplary embodiment of a circuit arrangement 1 according to the invention. The circuit arrangement 1 comprises a charging circuit 4 (charging operation), a power part 20 (stationary operation after the charging of the capacitor), a monitoring part 30 (voltage monitoring) and a blocking part 40.

The circuit arrangement 1 is constructed for limiting the starting current for intermediate voltage circuits which are constructed with at least one storage capacitor 2. For limiting the maximally flowing charging current in the storage capacitor 2 the previously cited charging circuit 4 is provided between a feed voltage source 3 and the storage capacitor 2. The charging circuit 4 comprises at least one semiconductor structural element 5 (here a MOSFET) with a gate 6, a resistor 7 and a transistor 8.

The semiconductor structural element 5 comprises a drain connection D, a source connection S and a gate 6. The drain source stretch between the drain connection D and the source connection S of the semiconductor structural element 5 is, as FIG. 1 shows, arranged in series with the storage capacitor 2.

Figure 2:
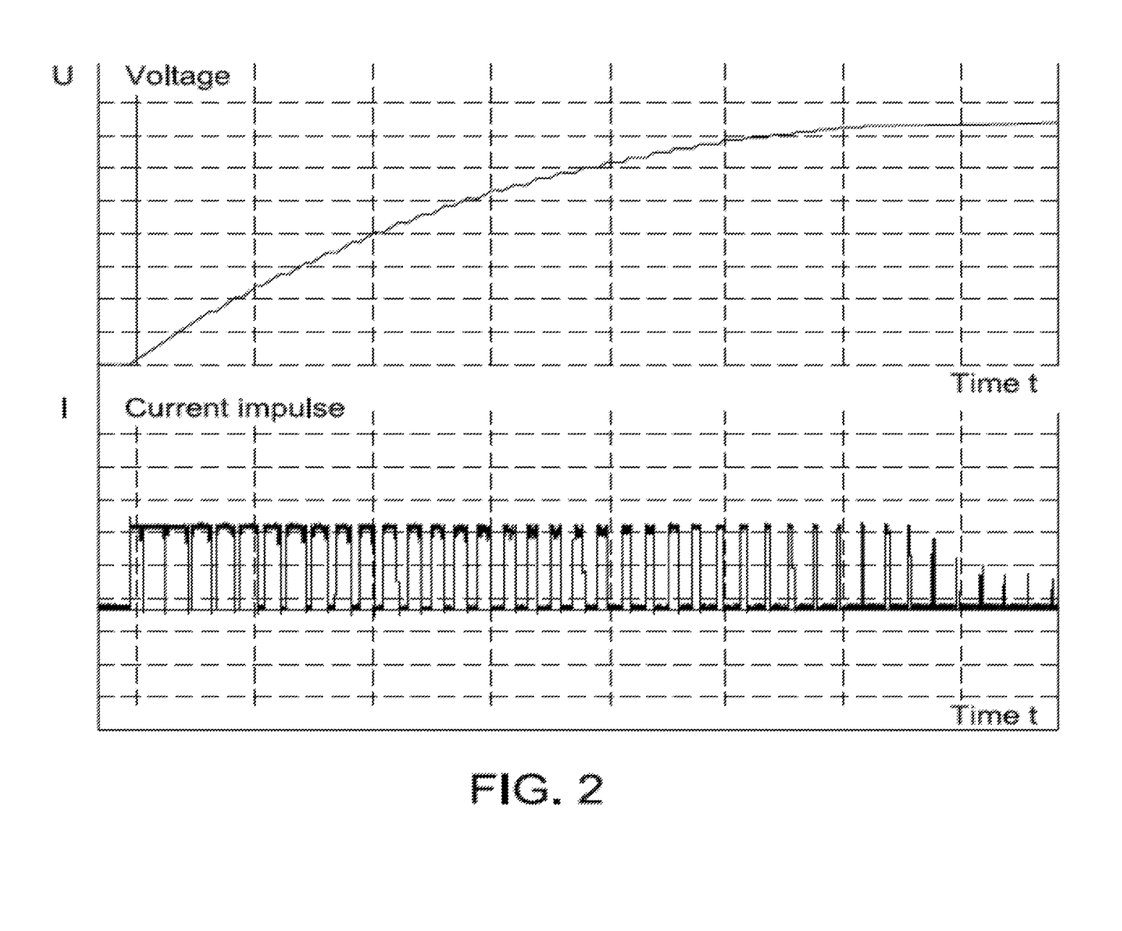
FIG. 2: Shows an illustration representing by way of example the charging process of the storage capacitor with a circuit according to the invention.

The charging of the storage capacitor 2 takes place via a plurality of charging current impulses ($I_1, \ldots I_n$) which are successive in time via this charging branch and which flow to the storage capacitor 2 during the brief connecting through of the drain source stretch of the semiconductor structural element 5. This is shown, for example, in the measuring curves of FIG. 2. The lower curve shows the course in time of the current impulses with which the capacitor is charged in accordance with the corresponding curve course of the upper curve.

The storage capacitor 2 is connected here to the drain connection D of the semiconductor structural element 5. Furthermore, the resistor 7 is connected in series in the charging current branch to the charging capacitor 2 and the semiconductor structural element 5. Accordingly, if a charging current flows over the charging current branch, a voltage drops on the resistor 7, which voltage is monitored, among other things, by the monitoring part 30. If an undesired current flows over the charging current branch after the complete charging of the storage capacitor 2 in stationary operation, a voltage detectable by the monitoring part 30 drops on the resistor 7 so that an error signal can be initiated in order to cut off the circuit.

Furthermore, a transistor 8 (here an NPN transistor) is provided for blocking and connecting the semiconductor structural element 2 through. The gate 6 of the semiconductor structural element 5 is connected via the base emitter stretch of the transistor 8 to the mass potential. If the base emitter stretch of the transistor 8 is blocked or connected through, then the gate 6 of the semiconductor structural element 5 is connected either to the mass potential or to a control voltage UST and is accordingly in the blocked state or in its connecting through position.

The transistor 8 comprises the base 10 and the resistor 7 is connected to the source connection S of the semiconductor structural element 5. A voltage tap 9 is between the resistor 7 and the source connection S, which tap is connected to the base 10 of the transistor 8. I.e., the transistor 8 switches according to whether a charging current (charging current impulse) is flowing in the charging current branch, since a voltage drop appears on the resistor 7, depending on the above.

Furthermore, a voltage divider 12 is provided in order to make available control voltage UST required for the switching of the semiconductor structural element 5. The gate 6 of the semiconductor structural element 5 is connected to the voltage divider 12 for switching the gate 6 via a control voltage line 11, preferably with a tap 13.

Furthermore, the charging circuit 4 comprises the transistor 16 which draws the potential on the gate 6 of the semiconductor structural element 5 to mass potential in its passage position and then blocks the charging branch. If the transistor 8 and the transistor 16 are in their blocked state, the control voltage UST is on the gate 6.

Furthermore, the power part 20 comprises the transistor 15, which serves to protect the circuit in the stationary operation. The transistor 15 (or, alternatively a MOSFET) bridges the charging circuit 4 as authorized.

The monitoring part 30 serves to monitor the voltage. In the present instance the voltage levels (potentials) are monitored on the gate 6 of the semiconductor structural element 5, on the base 10 of the transistor 18 for bridging the charging circuit and the voltage via the resistor 7. An error signal can be outputted from the monitoring part 30 via the interface 31.

Figure 3:
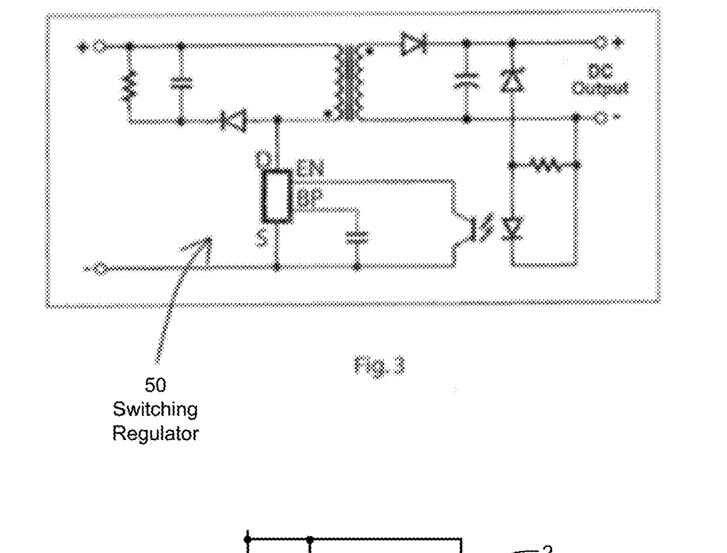
FIG. 3: Shows a blocking converter used by way of example for the charging circuit.

Other exemplary embodiments of the present invention are explained with reference made to the FIGS. 3 to 8. FIG. 3 shows a switching regulator 50 as an example for the charging circuit. The power circuit is clocked with a fixed frequency, wherein the starting time is limited by the current rise.

In such a configuration of the switching unit a compact construction can be realized in that the power switch is housed in a housing with a driver, the current limitation and the generation of the clocking signal. Furthermore, the unit can generate its required voltages by an internal voltage regulating itself so that no external control voltage is required.

Figure 4:
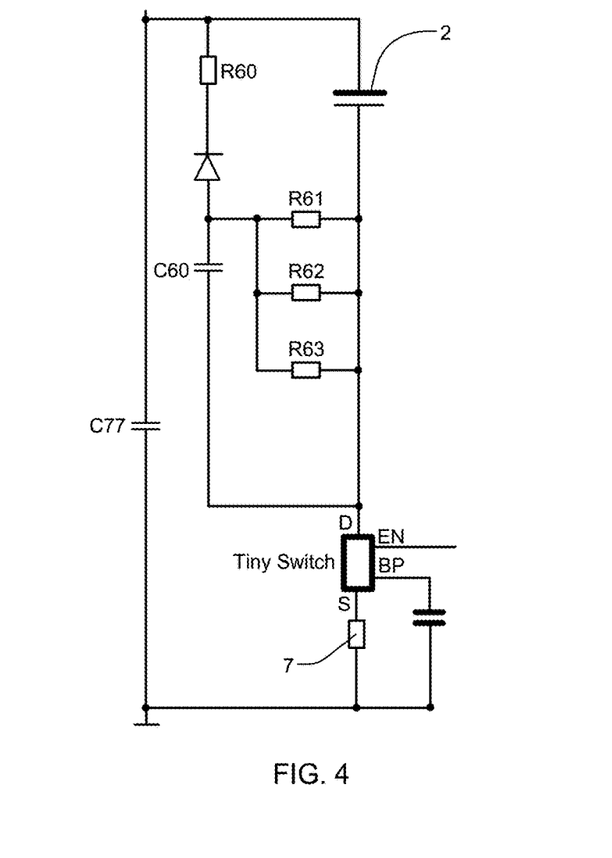
FIG. 4: Shows a view of an alternative embodiment of a charging circuit.

FIG. 4 shows a view of an alternative embodiment of a charging circuit 4. The switching regulator 50 shown (Tiny Switch) supplies itself by its "DRAIN"-PIN D. As soon as the switching regulator 50 has built up its operating voltages, the charging process begins. During this time the following process is taking place. At the beginning of a charging cycle the power switch is closed and the charging current of the charging capacitor 2 rises.

The slope of the current rise is given by a resistor 7 arranged in series with the switching regulator 50. If the current threshold of the switching regulator 50 has been reached, the power switch is blocked. A certain delay time in which the current rises further is present between the recognition of the current clamp and the blocking of the power switch. Furthermore, the structural elements, i.e., the resistors R60, R61, R62, R63, the diode D of the capacitor C60 are provided for reducing the load on the network during the cutting off of the power switch.

Figure 5:
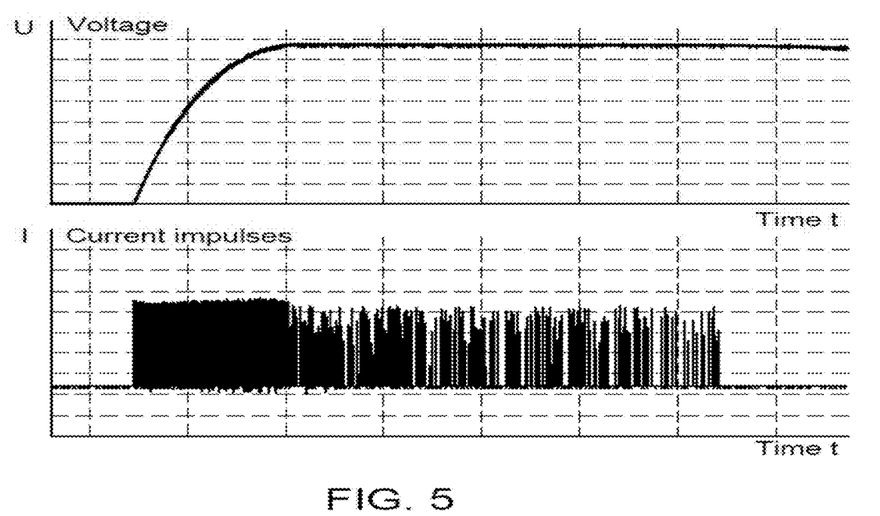
FIG. 5: Shows an illustration representing the charging process of a charging capacitor wired to the charging circuit.

FIG. 5 shows a corresponding illustration which represents the charging process of a charging capacitor 7 wired to the charging circuit 4 in FIG. 4. As can be gathered from the measured curves for charging voltage (upper measured curve) and charging current (lower measured curve), the current rises up to the value of the current limit of the switching regulator. The switching-off process of the power switch begins already at 75% of the indicated current. This switching cycle is repeated with the clock frequency of the switching regulator 50 (here: Tiny Switch) and is at the firmly set 130 kHz in the present exemplary embodiment.

Figure 6:
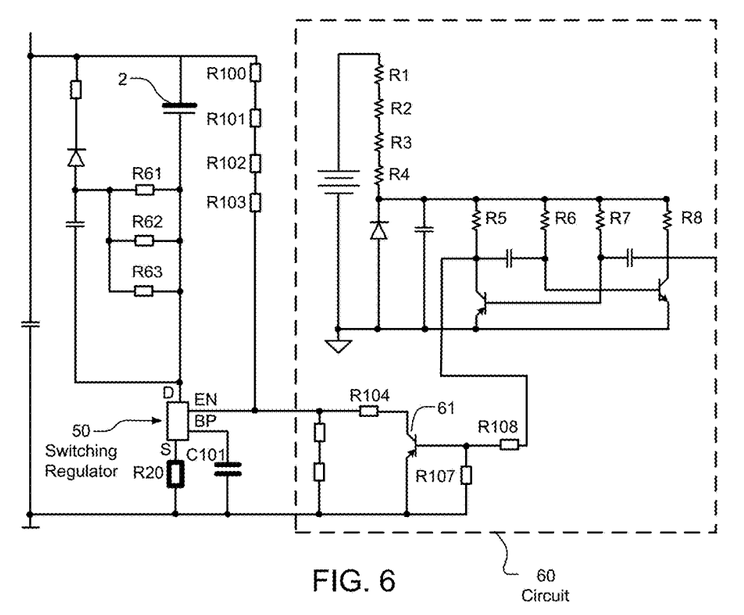
FIG. 6: Shows a view of an alternative other embodiment of a charging circuit.

The internal switching off of the switching regulator 50 must be circumvented by the circuit 60 shown in FIG. 6. A transistor 61 places the enable PIN EN of the switching regulator 50 at "zero" as soon as the output voltage is above the system-specific theoretical value. Subsequently, the previously described clocking is interrupted. If the output voltage drops again below the threshold the transistor 61 is again blocked and the clocking is continued.

As FIG. 6 shows, the bypass pin BP of the switching regulator 50 is connected to a capacitor C101. This serves to regulate the maximum flowing charging current. Furthermore, in order to recognize a voltage that is too low (recognition of low voltage), four series-connected resistors (R100, R101, R102 and R103) are provided in a line strand arranged parallel to the charging branch.

Furthermore, it can be recognized that the ENABLE PIN EN is connected to the transistor 61 by a resistor R104. The circuit 60 (see frame with dotted frame line) shown in FIG. 6 ensures by the transistor 61 that the open-loop control is operated. The transistor 61 is constructed with an adjustable clock frequency from which a period time for the cutting in and out results. The clock signal is generated with an astable sweep circuit.

Figure 7:
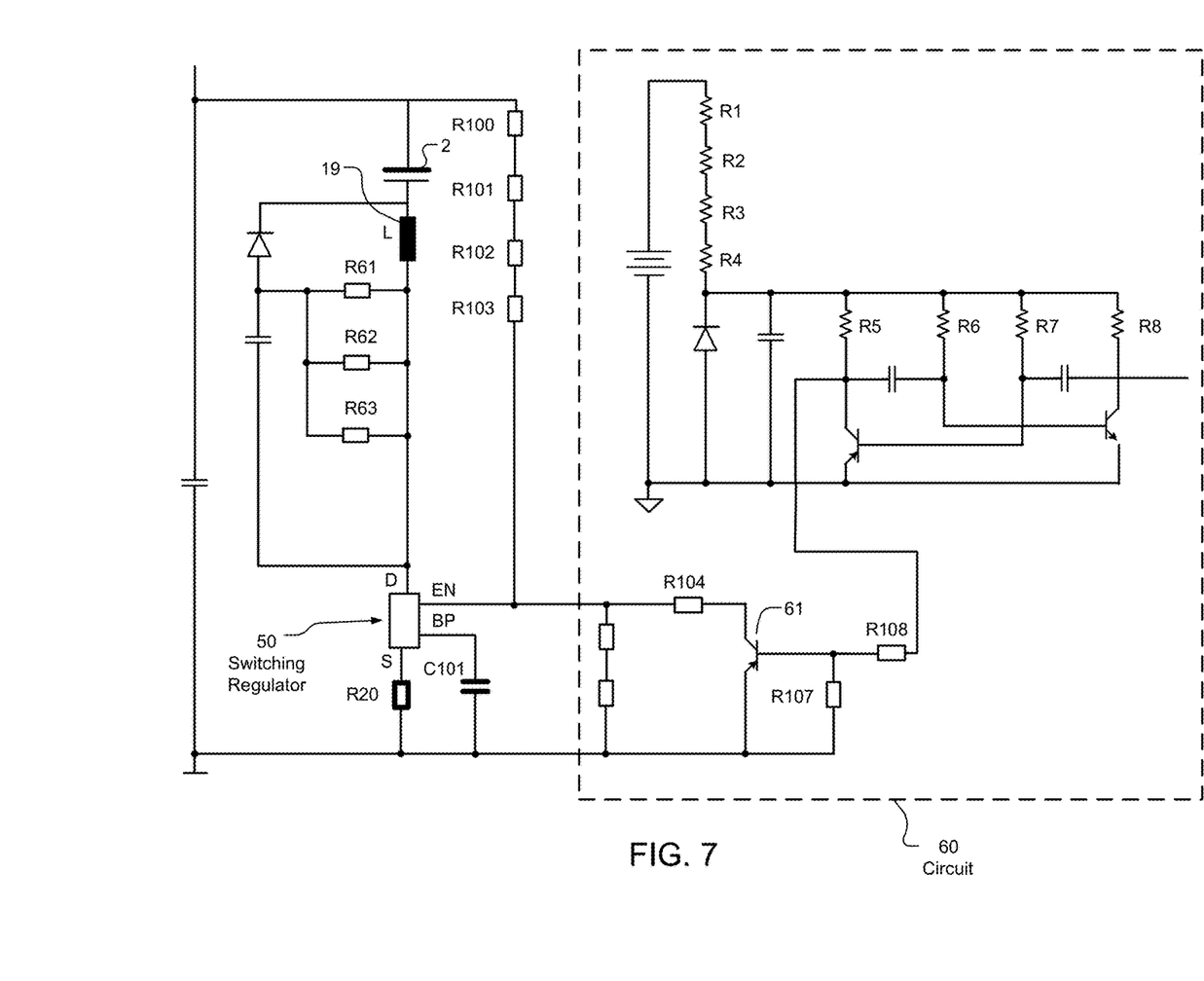
FIG. 7: Shows a view of an alternative other embodiment of a charging circuit.

At higher intermediate circuit capacities the charging time can be suitably reduced by the changes to the circuit according to the embodiment shown in FIG. 7. To this end the choke 19 is connected in series to the charging capacitor 2 for limiting the current rise. Based on the characteristic of the current rise by the choke 19, the time for the current rise becomes higher. This means in the reversing terminal that the power switch remains closed for a longer time span before the cut-off upon reaching the current threshold, as a result of which the charging capacitor 2 is more rapidly charged, as a result of which an optimized charging characteristic results.

Figure 8:
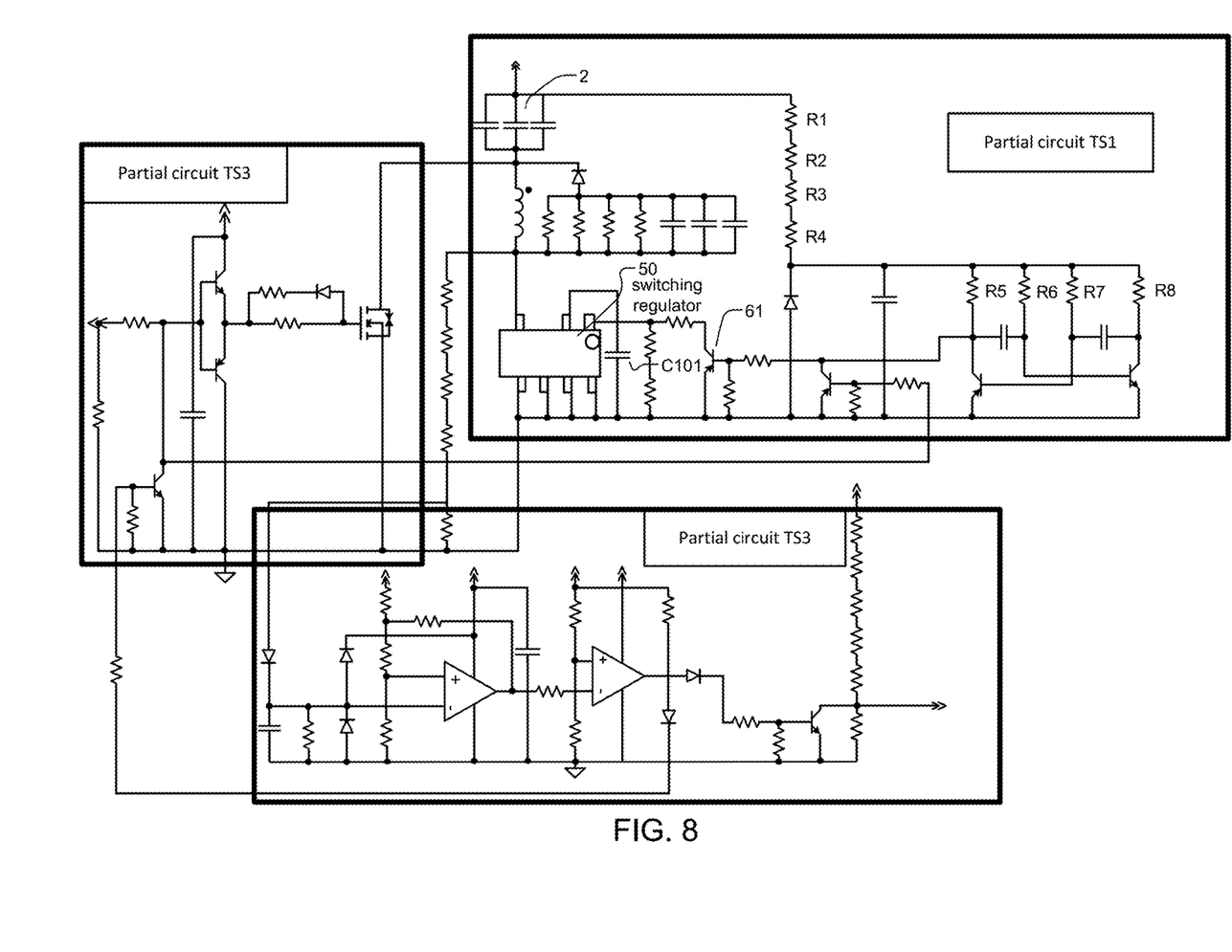
FIG. 8: Shows a view of an intermediate circuit wiring.

FIG. 8 shows a view of a second arrangement 1 (here an intermediate circuit wiring) for charging the charging capacitor 2 comprising three partial circuits (TS1, TS2 and TS3). The partial circuit TS1 corresponds to the previously described embodiment of the charging circuit 4. It can be recognized that the ENABLE PIN (EN) of the Tiny-Switch is connected by a resistor to the transistor 8. The pins 1, 2 and 4 to 8 have the following functions. Pin 1=Enable Pin (upper right in the illustration), pin 2=Bypass Pin (multi-function pin), pin 4 (upper left in the illustration)=Drain D and the lower pins 3 to 8 are Source Pins S. The partial circuit TS2 is a power part 20 which serves to bridge the power switch and to control the charging circuit. The partial circuit TS3 serves for the release as soon as the charging capacitor 2 is charged.

The invention is not limited in its construction to the above-indicated preferred exemplary embodiment but rather a number of variants are conceivable which make use of the solution shown even in the case of constructions which are basically differently designed.

The invention claimed is:

1. A circuit arrangement for limiting a starting current for an intermediate voltage circuit which is constructed with at least one storage capacitor, wherein a charging circuit is provided between a feed voltage source and the at least one storage capacitor for limiting a charging current flowing into the at least one storage capacitor, the charging circuit comprising at least one semiconductor structural element with a gate, a resistor and a transistor, wherein a drain source stretch is arranged between a drain connection and a source connection of the at least one semiconductor structural element in series with the at least one storage capacitor, and wherein the charging of the at least one storage capacitor takes place by a plurality of charging current impulses $(I_1, \ldots I_n)$ which are successive in time and which flow during a brief connecting through of the drain source stretch of the at least one semiconductor structural element to the at least one storage capacitor, and wherein the resistor is arranged in series with the drain source stretch of the at least one semiconductor structural element and is connected to the source connection of the at least one semiconductor structural element, so that a voltage drop is brought about on the resistor with which a base of the transistor can be controlled in order to connect through the transistor, which brings about that the gate of the at least one semiconductor structural element is connected to a mass potential of the circuit arrangement and as a result the at least one semiconductor structural element goes into a blocking state, wherein, prior to switching on of a consumer fed from the intermediate voltage circuit, at least one additional transistor is activated in order to switch the at least one semiconductor structural element into a blocking state.

2. The circuit arrangement according to claim 1, wherein the gate of the at least one semiconductor structural element is connected to the mass potential by a base emitter stretch of the transistor arranged between the base and an emitter of the transistor and, depending on whether the base emitter stretch of the transistor is blocked or conducting, the gate of the at least one semiconductor structural element is either connected to the mass potential or to a control voltage $U_{ST}$.

3. The circuit arrangement according to claim 1, wherein the transistor comprises an intermediate tap is present between the resistor and the source connection which the intermediate tap is connected to the base of the transistor.

4. The circuit arrangement according to claim 1, wherein the gate of the at least one semiconductor structural element is connected for applying a control voltage $U_{ST}$ required for switching the gate to a control voltage line.

5. The circuit arrangement according to claim 1, wherein the at least one storage capacitor is connected to the drain connection of the at least one semiconductor structural element.

6. The circuit arrangement according to claim 1, wherein the at least one semiconductor structural element is made available by a switching regulator.

7. The circuit arrangement according to claim 6, wherein the switching regulator is constructed as a blocking converter (Tiny-Switch).

8. The circuit arrangement according to claim 6, wherein the transistor is connected to an ENABLE PIN of a blocking converter, wherein a drain source stretch between a drain connection and a source connection of the blocking converter is arranged in series with the at least one storage capacitor, and wherein the charging of the at least one storage capacitor takes place via the plurality of charging current impulses ($I_1, \ldots I_n$) successive in time which flow to the at least one storage capacitor during the brief conducting of the drain source stretch of the at least one semiconductor structural element.

9. A method for limiting the starting current for the intermediate voltage circuit with the switching arrangement according to claim 6, the method comprising:
  a. charging the at least one storage capacitor by the plurality of charging current impulses ($I_1, \ldots I_n$) via closing power switch, wherein the charging of the at least one storage capacitor is brought about while a charging amount corresponding to a particular one of the charging current impulses ($I_1, \ldots I_n$) flows to the at least one storage capacitor and the charging current of the charging capacitor rises, and
  b. during the rising of the charging current above a current threshold of the switching regulator the power switch is reopened, as a result of which the charging current is interrupted.

10. The method according to claim 9, wherein a. and b. are repeated until the at least one storage capacitor is charged.

11. The method according to claim 10, wherein the charging is brought about by controlling ENABLE PINS of the switching regulator.

12. A method for limiting the starting current for the intermediate voltage circuit with the circuit arrangement according to claim 1, wherein:
  a. the charging of the at least one storage capacitor is brought about by the plurality of charging current impulses ($I_1, \ldots I_n$) for a duration of conducting of the drain source stretch of the at least one semiconductor structural element by putting a control voltage on the gate of the at least one semiconductor structural element for this time period while a charging amount corresponding to a particular one of the charging current impulses ($I_1, \ldots I_n$) flows to the at least one storage capacitor, and
  b. during the flowing of the charging current over the resistor the voltage drops which is present via an intermediate tap on the base of the transistor and then connects the transistor through, as a result of which a potential on the gate of the at least one semiconductor structural element is lowered and the at least one semiconductor structural element is blocked, as a result of which the charging current is interrupted.

13. The method according to claim 12, wherein the charging current to the at least one storage capacitor is interrupted in that the drain source stretch of the at least one semiconductor structural element is blocked, as a result of which a voltage on the resistor and therefore on the base of the transistor drops and the transistor changes into the blocked state.

14. The method according to claim 12, wherein prior to switching on of the consumer fed from the intermediate voltage circuit, a second transistor is activated in order to bridge the charging circuit for charging the at least one storage capacitor.

\* \* \* \* \*